(12) United States Patent
Dumoulin et al.

(10) Patent No.: US 9,866,322 B2
(45) Date of Patent: *Jan. 9, 2018

(54) LASER RECEIVER

(71) Applicant: LEICA GEOSYSTEMS AG, Heerbrugg (CH)

(72) Inventors: Charles Leopold Elisabeth Dumoulin, Balgach (CH); Anton Kehl, Rüthi (CH); Martin Winistörfer, Hinterforst (CH); Thomas Ammer, Widnau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,638

(22) Filed: Jun. 29, 2016

(65) Prior Publication Data

US 2016/0315703 A1    Oct. 27, 2016

Related U.S. Application Data

(63) Continuation-in-part of application No. 14/384,575, filed as application No. PCT/EP2013/055470 on Mar. 15, 2013, now Pat. No. 9,407,364.

(30) Foreign Application Priority Data

Mar. 15, 2012    (EP) .................................... 12159665

(51) Int. Cl.
*H04B 10/50*    (2013.01)
*H04B 10/114*    (2013.01)

(52) U.S. Cl.
CPC ................ *H04B 10/1143* (2013.01)

(58) Field of Classification Search
CPC ... H04B 10/1123; H04B 10/503; H04B 10/60
See application file for complete search history.

(56) References Cited

U.S. PATENT DOCUMENTS 6,314,650 B1 *  11/2001  Falb ..................... G01C 15/004
                                                  33/286
6,633,373 B2 *  10/2003  Ammann ............ G01C 15/004
                                                  356/138

(Continued)

FOREIGN PATENT DOCUMENTS

DE    197 16 710 B4    7/2010
EP    1 006 339 A2     6/2000

(Continued)

OTHER PUBLICATIONS

European Search Report dated Jul. 24, 2012 as received in Application No. EP 12 15 9665.

(Continued)

*Primary Examiner* — Dzung Tran
(74) *Attorney, Agent, or Firm* — Maschoff Brennan

(57) ABSTRACT

The invention relates to a laser system comprising a laser receiver collaborating with a laser emitter. The laser emitter is designed to provide a laser light plane and includes a control unit connected to a communication signal receiver in order to process and compute incoming communication signals from the laser receiver. The laser receiver comprising a communication signal transmitter for communicating with the laser emitter, a linear laser light photo sensor and an acceleration sensor both connected to a circuitry, which is designed to derive a movement of the laser receiver with respect to the detected laser beam of the laser emitter from computing and correlating the signals of the acceleration senor and the laser light photo sensor. The control unit includes an adjustment unit and adjustment is carried out by the adjustment unit in dependence of the processed and computed incoming communication signals of the laser receiver.

31 Claims, 6 Drawing Sheets

(56) References Cited

U.S. PATENT DOCUMENTS

| | | |
|---|---|---|
| 6,691,437 B1 | 2/2004 | Yost et al. |
| 7,409,312 B2 | 5/2008 | Conner et al. |
| 7,990,550 B2 | 8/2011 | Aebischer et al. |
| 8,269,984 B2 | 9/2012 | Hinderling et al. |
| 9,407,364 B2 * | 8/2016 | Dumoulin ............ G01C 15/004 |
| 2001/0004287 A1 | 6/2001 | Ammann |
| 2003/0136901 A1 | 7/2003 | Ohtomo et al. |
| 2005/0207621 A1 * | 9/2005 | Murai .................. G01C 15/002 |
| | | 382/106 |
| 2009/0119050 A1 * | 5/2009 | Hayashi ............... G01C 15/002 |
| | | 702/94 |
| 2009/0171618 A1 * | 7/2009 | Kumagai ................ E02F 3/842 |
| | | 702/152 |
| 2011/0235053 A1 * | 9/2011 | Campagna ........... G01C 15/006 |
| | | 356/614 |

FOREIGN PATENT DOCUMENTS

| | | |
|---|---|---|
| EP | 1 703 300 A1 | 9/2006 |
| EP | 1 988 360 A1 | 11/2008 |
| EP | 2 053 353 A1 | 4/2009 |
| EP | 2 199 739 A1 | 6/2010 |
| EP | 2 639 548 A1 | 9/2013 |
| WO | 2008/008210 A2 | 1/2008 |
| WO | 2012/059276 A1 | 5/2012 |

OTHER PUBLICATIONS

International Search Report and Written Opinion dated Aug. 30, 2013 in application No. PCT/EP2013/055470.

\* cited by examiner

LASER RECEIVER

FIELD OF THE INVENTION

The present invention relates to a system comprising a laser receiver collaborating with a laser emitter.

BACKGROUND

Laser receivers are often used at construction sites in order to locate a reference laser beam, in particular the laser beam of a rotating construction laser or the fan like laser beam of a line laser. Rotating construction lasers, which are designed to provide a laser light plane upon rotating the emitted laser beam are well known by persons skilled in the art and therefore not described in detail herein. An embodiment of a line laser generating a fan like laser light plane is i.e. given in EP 1988360 A1. The reference light plane generated by the rotating construction laser or the line laser may be horizontal or inclined. It is used at the construction site for various purposes, i.e. for guiding construction machines or for carrying out various measurements based on the plane, i.e. for allowing construction workers to quickly lay out visible marking-lines or adjust heights.

An example for a laser guided construction machine is given in U.S. Pat. No. 6,691,437 B1. Disclosed in this document is a level sensing system for use with an excavating machine. A laser receiver is mounted on the dipper stick of the machine in order to indicate the relative location of the dipper stick to the reference laser beam, based on the incidences of the laser beam striking over the light receiving sensor of the laser receiver. The dipper stick is further provided with an inclinometer, which inclinometer comprises a gyroscopic inclination sensor and an accelerometer. The accelerometer senses acceleration due to gravity and provides a static vertical reference in order to compensate the long term drift of the gyroscopic inclination sensor.

However, due to eye safety regulations laser emitters used on a construction site, i.e. rotating construction lasers and line lasers have to have low power beams. Hence, the laser beam of such a conventional laser emitter is—on the one hand —able to indicate, i.e. a precise visible reference line at a wall near by, but—on the other hand—tends to defocus and become dimmer at further distance to the light source, so that the beam has to be located by using a laser receiver.

Conventional laser receivers include a laser light photo sensor and a circuitry, wherein the photo sensor comprises a linear array of photo sensitive elements and is connected to said circuitry. The photo sensitive elements provide an electrical output signal, when illuminated by the laser beam, which electrical output signal is transferred to and computed by the circuitry. The results of the computation are presented to the user by output means like a display integrated in the laser receiver and connected to the circuitry. Examples of such laser receivers are given, i.e. in EP 2 199 739 A1, U.S. Pat. No. 7,409,312 B and WO 2008/008210 A2. Particularly, those laser receivers have a defined zero position, e. g. the centre of the photo sensor array. For localization of the laser beam, the zero position of the laser receiver has to be brought steadily into match with the laser plane. Some laser receivers, like the laser receiver disclosed in U.S. Pat. No. 7,409,312 B, are further provided with a gravity reference device and optionally with a GPS receiver in order to facilitate a precise localization. An additional laser distance measurement device may further allow for computing a 3D position of the laser receiver. The method described in WO 2008/008210 A2 discloses to integrate a rangefinder within the laser receiver for determining the distance to the laser emitter. However, this requires that the laser receiver orientation is very well aligned to the laser emitter, which is often quite difficult especially at construction sites.

Precise localization of the reference laser light plane is a time consuming procedure, especially when it is a laser light plane generated by a rotating laser beam, in particular if an infrared laser beam is used. The conventional hand-held laser receiver has to be swept several times slowly in a direction perpendicular to the laser light plane in order to catch at least two strikes of the laser beam with each of the sweeps, i.e. a first strike at the outermost photo sensitive element of the linear array of photo sensitive elements and a second strike at a photosensitive element closer to the zero position in the center of the linear array of photo sensitive elements. The different incidences at the array of photo sensitive elements indicate the moving direction of the laser receiver with respect to the laser light plane, which moving direction is derived by the circuitry from the electronic output signals of the photo sensitive elements and is indicated to the user by an according output, i.e. on the display of the laser receiver or as an audio signal. In order to bring the laser receiver in a position, where consecutive strikes of the laser beam illuminate only the zero position at the center of the aligned photo sensitive elements, so that the laser receiver is on-grade, the user moves the laser receiver in an iterative process of consecutive sweeps through the laser light plane. Thus, it can be stated that to know the laser light plane and/or the position and orientation of the laser receiver relative to the laser emitter on a construction site is still a time-consuming procedure.

SUMMARY

Some embodiments of the present invention provide for a laser system with a laser receiver and a laser emitter that allows a more efficient localization of a laser beam in particular a more efficient localization of a laser light plane of a rotating construction laser.

Some embodiments of the present invention improve the collaboration—especially the positioning and search collaboration—of a laser receiver with a laser emitter in particular a laser emitter emitting a reference laser light plane.

Further aspects of the invention are claimed in the European patent application filed the same date as this application and having the European application number 12159573.0. Thus, the content of the European patent application No. 12159573.0 is herewith incorporated in this application.

The laser receiver according to the invention is designed for detecting the laser light of a laser beam, in particular the reference laser beam of a rotating construction laser or the fan like laser beam of a line laser each designed to provide a laser light plane. The laser receiver has a circuitry connected to a laser light photo sensor and connected to output means. The laser light photo sensor—particularly having a zero position—provides electrical output signal to the circuitry when illuminated by the reference laser beam. The circuitry is configured to compute the output signal of the photo sensor. The laser receiver further comprises an acceleration sensor designed to provide an electrical output signal indicating a movement and at least a movement direction of the laser receiver and being connected to the circuitry as well. The circuitry is designed to compute and correlate the output signal of the laser light photo sensor and the output signal of the acceleration sensor in such a way that at least the movement direction of the laser receiver relative to the detected laser beam is derived. As the circuit is connected to output means, information regarding the movement of the laser receiver with respect to the laser beam as well as information derived from the output signal of the photo sensor and from the output signal of the acceleration sensor is deliverable. Further alert signals (audio signals and/or visual signals) can be given in case of sudden movements of the laser receiver extending a predetermined acceleration level or a predetermined movement distance, wherein the predetermined values can be a pre-programmed set of values or can freely be set by the user. Such an alert signal or a stop signal stopping the laser emitter and/or other units can e. g. advantageously be given when the optical contact between the laser emitter and the laser receiver has been lost.

Using the information of the acceleration sensor in connection with the information of the laser light photo sensor for deriving the movement direction of the laser receiver with respect to the laser beam, the number of beam strikes, which have to be caught by the laser light photo sensor per sweep can be reduced to one. Hence the sweep speed used for moving the laser receiver through the laser plane can be increased. Thus, the invention enables to locate the laser beam and the laser light plane, respectively more efficiently.

The laser light photo sensor of the laser receiver comprises preferably a linear array of photo sensitive elements. A zero position of the laser light photo sensor e. g. can be in the center of the array.

The photo sensitive elements can advantageously be avalanche photodiodes and/or PSD sensors.

In a preferred embodiment the laser light photo sensor of the laser receiver comprises at least one further linear array of photo sensitive elements, wherein the two arrays are arranged parallel to each other and apart from each other in a predetermined distance, so that a strike of the emitted laser beam hits the at least two arrays at different times allowing a calculation of the distance between the laser receiver and the laser emitter by the connected circuitry of the laser receiver using the time of passing method, as it is described e. g. in DE 19716710 B4.

According to another embodiment of the laser receiver a plurality of linear arrays of photo sensitive elements can be arranged on the lateral surface of a cylinder in order to facilitate detection of the laser beam and determining the distance by using the time of passing method.

In order to allow an operator to transfer with high precision the detected height of the reference laser light plane onto a target surface like a wall, the laser receiver may comprise a height mark, i.e. in form of a laser beam, on one side of the receiver housing, which is preferably not the side the laser light photo sensor receives the laser beam.

According to another preferred embodiment of the invention, the acceleration sensor is designed as a three-axis acceleration sensor, to detect movements or accelerations of the laser receiver in three different directions. Preferably, the three spatial axis are arranged perpendicular, so that the movement of the laser receiver is easily derivable in a Cartesian coordinate system. Based on the information derived by said acceleration sensor, faults generated by a non-plumb orientation of the laser receiver in adjusting or readjusting a laser plane can automatically eliminated.

In order to increase the precision of the location information the laser receiver can be provided with further equipment, like an inclination sensor, a compass and/or a GPS receiver.

Particularly said circuitry is further designed to derive the movement acceleration and/or the movement velocity and/ or to estimate the movement end position of the laser receiver with respect to said laser beam from computing and correlating the output signal of the acceleration sensor and the output signal of said laser light photo sensor.

In a further embodiment the circuit further can deliver independent pieces of information derived by the various sensors, i.e. based on the output signals from the acceleration sensor—, namely the moving and the moving direction/ moving acceleration/moving velocity/end position of the movement of the laser receiver—and from the photo sensitive element—namely a confirmation or non-confirmation that a laser beam has been found and where at the array it hits—and so on. Additionally, as already mentioned above, information representing a correlation of these pieces of information can be delivered by the circuit, namely the moving direction of the laser receiver with respect to the laser beam or with respect to the coordinate system derived from the GPS receiver or so forth.

Such information, can be delivered to the user by output means like a loud speaker or usually a display, integrated in the laser receiver and connected to the circuitry. It further can be transmitted wireless or by means of a cable connection to an external unit of data-analyzing means and/or control means and/or to the laser emitter, particularly the rotating construction laser. For this purpose the laser receiver is provided with communication means.

It is understood that these communication means are preferably designed for remote, i.e. wireless, communication.

A laser emitter configured to communicate with a laser receiver described in its various embodiments above comprises communication means in order to receive communication signals from the laser receiver and a control unit in order to process the incoming communication signals of the laser receiver. Those communication signals are preferably "command signals" derived by the circuitry of the laser receiver from the electrical output signals of the acceleration sensor and/or the laser light photo sensor of the laser receiver or those communication signals are the electrical output signals of the acceleration sensor.

In order to process the incoming communication signal the control unit of the laser emitter is provided with an adjustment unit for adjusting the focus of the reference laser beam and/or a tilt of the reference light plane generated by the laser emitter and/or an elevation of the reference light plane generated by the emitted laser beam and/or the intensity of the laser light emitted by the laser emitter.

In a preferred embodiment the circuitry of the laser receiver and/or the control unit of the laser emitter are designed to determine the 3-dimensional position of the laser receiver in relation to the laser emitter based on the output signals of the laser light photo sensor and the acceleration sensor provided when illuminated by the laser beam of the laser emitter providing at least two laser light planes having different inclination angles and/or a different offset.

Another known but more complicated method is using the wireless communication means integrated in both, the laser emitter and laser receiver, for positioning. A wireless communication standard means that allows such a positioning is for instance Zigbee or a Local Positioning Radio (LPR). Further wireless position-determining methods, such as GPS, may also be applied.

The laser emitter is preferably a rotating construction laser emitting a rotating laser beam or a line laser emitting a fan like laser beam.

In cases of a rotating construction laser the control unit of the laser emitter is provided with an adjustment unit for adjusting a rotating speed of the reference laser beam. This is very advantageous when searching for the laser beam or the laser receiver. Thereby the rotating speed can e. g. be decreased from maximum down to stationary.

A laser system configured like this allows for an easy adjustment of the laser plane, i.e. movement of the laser plane in an upward or downward direction or tilt of the laser plane, with respect to the laser receiver.

The adjustment occurs advantageously in correlation with the distance between laser receiver and laser emitter and/or the calculated 3D position of the laser receiver and/or the movements of the laser receiver and in particular with the movement directions and/or the acceleration of the laser receiver.

Depending on location and movement of the laser receiver, the adjustment of the rotation speed of the laser beam can be set in a pro-active manner and be adapted to signal changes indicating movements of the laser receiver, for example by increasing the rotation velocity or to start a search for the laser receiver by re-orientating the laser plane into a direction where the laser receiver has left the laser plane.

The latter one in particular is beneficial when a construction machine provided with a laser receiver and guided a laser light plane generated by a rotating construction laser, accidentally loses the contact to the reference laser beam, i.e. caused by weak ground or an unevenness of the ground.

For this purpose the control unit of the laser emitter is provided with search functionality in order to re-orientate the laser beam if an optical contact with the laser receiver has been lost. The search functionality may additionally, e.g., enable to increase automatically the rotation speed of the laser beam and/or the movement in upward or downward direction and/or tilt movement of the generated laser plane. Further the light intensity of the laser beam and the focus may be adapted, preferably dependent on last calculated 3D position of the laser receiver or the last estimated distance between laser receiver and laser emitter.

The rotating construction laser can further be provided with means for restricting the extent of the laser plane in particular by beam masking or by limiting a pendulum motion of the laser beam between pre-defined end points. This embodiment is also particularly useful in combination with the search functionality. It allows for higher resolution for location and determination of the laser receiver, and also for sweeping the laser beam faster within a region of interest.

Similar search functionality may be integrated in a line laser emitting a fan like laser beam and collaborating with a laser receiver according to the invention, except the adaptation of the rotation speed of the laser beam.

For communication of the laser receiver with a laser emitter, the laser receiver and the laser emitter are integrated in a laser system, wherein the laser receiver comprises at least a communication signal transmitter and the rotating construction laser comprises at least a communication signal receiver and a control unit in order to process the incoming communication signal.

In a more preferred embodiment of the laser system the laser receiver and the rotating construction laser are provided with communication signal transceivers, so that laser receiver and rotating construction laser can both transmit and receive communication signals. Having communication signal transceivers the laser receiver and the rotating construction laser may also communicate to external data analyzing units or control units.

The laser receiver and, optionally also, the laser emitter may also be provided with compasses for facilitating a search for the laser receiver in an azimuthal direction, using that the laser receiver is typically aligned within 45° vertical angular direction with respect to the direction of the reference laser beam. Further wireless position-determining methods, such as GPS may also be applied.

As described above, the laser system comprising a laser receiver and a laser emitter according to any one of the embodiments disclosed above can be designed for control of a construction machine. In that case a laser receiver according to any one of the embodiments disclosed above is attached to and movable with the construction machine.

Subject of the invention is also the use of a laser system, according to any one of the embodiments of the invention disclosed above, for controlling and guiding a construction machine on a construction site.

For these embodiments, the laser receiver is an integral part of a guiding system for the construction machine, which may, particularly, be operated unattended or under remote control. If the laser receiver, provided with an acceleration sensor, has lost optical contact with the laser plane, an operation mode of the laser may (automatically) be switched to a search mode and start a search for the laser receiver and the construction machine. For example, based on information from the acceleration sensor about the direction of movement of the laser receiver, the sweep speed of the laser beam may be increased, in order to optically relocate the laser receiver and the construction machine. Furthermore, a warning signal for operating personnel may be emitted, or the construction machine may be re-directed into reach of the reference laser beam, enabled by an adequate guiding system for the construction machine. If multiple construction machines are guided using the same reference laser beam, a signal for interruption of operation of the other construction machines may be sent.

Furthermore, for allowing simultaneously a distance measurement, the laser receiver is preferably provided with a distance measurement device, typically then with an electronic distance measurement device.

Another aspect of the invention relates to a laser system comprising a laser receiver collaborating with a laser emitter, wherein the laser receiver is designed to detect the laser light beam of a laser emitter with a laser light photo sensor—particularly having a zero position—providing an electrical output signal when illuminated by a laser beam, the laser receiver further comprises a circuitry designed to receive and to compute the electrical output signal of said laser light photo sensor and a communication signal transmitter for communicating with the laser emitter using communication signals, and the laser emitter is designed to provide a laser light plane and comprises a control unit connected to a communication signal receiver in order to process and compute the incoming communication signals from the laser receiver.

According to this aspect of the invention, the laser receiver has a trajectory sensor unit designed to continuously provide an electrical output signal indicating a trajectory of a movement of the laser receiver, and said circuitry is designed to derive a position of the laser receiver relative to the laser emitter from computing and correlating the output signal of the trajectory sensor unit and the output signal of said laser light photo sensor.

According to one embodiment of this laser system, the laser receiver is designed to communicate the derived position, the output signals and/or the derived result of the computing and correlation process to the laser emitter which is then processed and computed by the control unit of the laser emitter as incoming communication signals, and the control unit of the laser emitter is provided with an adjustment unit and adjustment is carried out by the adjustment unit in dependence of the processed and computed incoming communication signals, wherein adjustment comprises adjusting at least one of a tilt of the reference light plane generated by the emitted laser beam; an elevation of the reference light plane generated by the emitted laser beam; focusing and defocusing of the laser beam; adjusting the intensity of the laser light of the emitted laser beam; and adjusting a rotating head speed of a rotating laser beam.

According to one embodiment of this laser system, the adjustment is carried out by the adjustment unit also in dependence of a present tilt of the reference light plane.

According to another embodiment of this laser system, the laser emitter is adapted to determine a trajectory of the emitted laser beam, and the adjustment is carried out by the adjustment unit also in dependence of the trajectory of the emitted laser beam. This allows combining and/or correlating the trajectories determined by the receiver and the laser emitter in order to be able to calculate the relative position between the laser beam and the receiver or between the receiver and the emitter. For instance, if the laser beam is moved due to tilt adjustments, the system can include these changes for calculating the true position or movement at all times.

According to a preferred embodiment of the laser system, the trajectory sensor unit is designed to continuously provide an electrical output signal indicating a trajectory of a movement of the laser receiver in six degrees-of-freedom, and the circuitry is designed to derive a three-dimensional position of the laser receiver.

According to another preferred embodiment, the laser emitter is a rotating construction laser designed to provide a laser light plane upon rotating the emitted laser beam; or a line laser designed to emit a laser beam in form of an expanded fan like laser light plane.

According to yet another embodiment, the trajectory sensor comprises a three-axis acceleration sensor.

According to yet another embodiment, the trajectory sensor unit comprises an inertial measurement unit.

According to yet another embodiment, the trajectory sensor unit comprises a pressure sensor.

According to one embodiment, the trajectory sensor unit comprises a plurality of sensors, e. g. a combination of a pressure sensor and either a three-axis acceleration sensor or an inertial measurement unit.

According to yet another embodiment, the trajectory sensor unit comprises a visual inertial system having at least one camera.

Another aspect of the invention relates to a laser system comprising a laser receiver collaborating with a laser emitter, wherein
 the laser receiver is designed to detect the laser light beam of a laser emitter with a laser light photo sensor providing an electrical output signal when illuminated by a laser beam;
 the laser receiver further comprises a circuitry designed to receive and to compute the electrical output signal of said laser light photo sensor and a communication signal transmitter for communicating with the laser emitter using communication signals;
 the laser emitter is designed to provide a laser light plane and comprises a control unit connected to a communication signal receiver in order to process and compute the incoming communication signals from the laser receiver;
 the laser receiver has a movement sensor unit designed to provide an electrical output signal indicating a movement of the laser receiver, the movement sensor unit comprising a pressure sensor and/or a visual inertial system;
 said circuitry is designed to derive the moving direction of the laser receiver with respect to said laser beam from computing and correlating the output signal of the movement sensor unit and the output signal of said laser light photo sensor;
 the laser receiver is designed to communicate the output signals and/or the derived result of the computing and correlation process to the laser emitter which is then processed and computed by the control unit of the laser emitter as incoming communication signals; and
 the control unit of the laser emitter is provided with an adjustment unit and adjustment is carried out by the adjustment unit in dependence of the processed and computed incoming communication signals.

According to this aspect of the invention, adjustment comprises adjusting at least one of
 a tilt of the reference light plane generated by the emitted laser beam;
 an elevation of the reference light plane generated by the emitted laser beam;
 focusing and defocusing of the laser beam;
 adjusting the intensity of the laser light of the emitted laser beam;
 adjusting a rotating head speed of a rotating laser beam; and
 emitting a warning signal.

A movement sensor unit having a pressure sensor allows determining changes of the altitude of the laser receiver.

The visual inertial system of the movement sensor unit is adapted to determine a movement of the receiver by visual means, and preferably is adapted to capture images and to track features in the images during the movement of the laser receiver, e. g. for determining eigenposes.

BRIEF DESCRIPTION OF THE DRAWINGS

The invention will be explained in greater detail below with reference to examples of possible embodiments shown schematically in the drawings, in which.

DETAILED DESCRIPTION

Figure 1A:
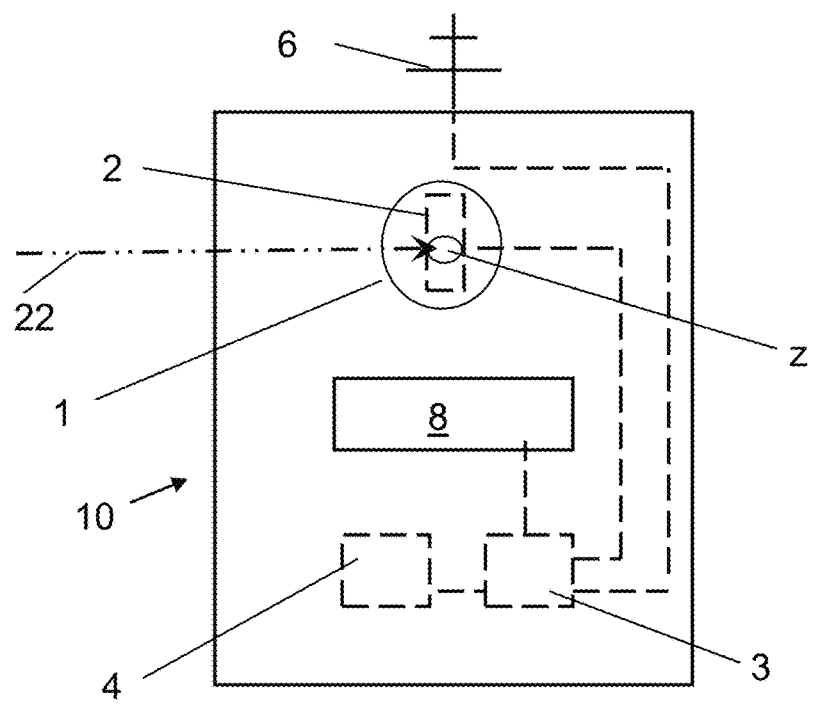
FIG. 1a shows an embodiment of the inventive laser receiver.

FIG. 1a shows an illustration of an embodiment of the laser receiver 10 of the inventive laser system. The laser receiver 10 comprises a laser light photo sensor 1 having a plurality of photo sensitive elements 2 arranged in a linear array, which photo sensitive elements 2 providing an electrical output when illuminated by a reference laser beam 22. The laser light photo sensor and the photo sensitive elements 2, respectively are connected to a circuitry 3. Particularly, the reference laser beam 22 may originate from a rotating construction laser designed to provide a laser light plane upon rotating the emitted laser beam 22 or from a line laser emitting an expanded fan like laser beam (not shown). The laser receiver 10 comprises an acceleration sensor 4 also connected to the circuitry 3. The acceleration sensor 4 is designed to provide an electrical output signal when the laser receiver is moved. Optionally the acceleration sensor 4 can be adapted as a part of an inertial measurement unit (IMU), particularly comprising three acceleration sensors, three gyroscopes and optionally three magnetometers. The electrical output signal further indicates a movement and a movement direction of the laser receiver 10. The circuitry 3 of the laser receiver is configured to compute and correlate the incoming electrical signals from the photo sensor 1 and the acceleration sensor 4 to provide a correlation signal indicating the movement of the laser receiver 10 with respect to the laser beam 22. The circuitry 3 is further connected to an output means 8. In this example the output means 8 is a display and, i.e. the moving direction of the laser receiver 10 with respect to the laser beam 22 is indicated to a user 5 (FIG. 2) on the display 8. Further output means in form of a loudspeaker (not shown) may be integrated in the laser receiver as well.

Further the circuitry 3 of the laser receiver is configured to derive movement acceleration and/or movement velocity and/or an estimated end position of the movement of the laser receiver 10 from the electrical output signal of the acceleration sensor 4.

Figure 1B:
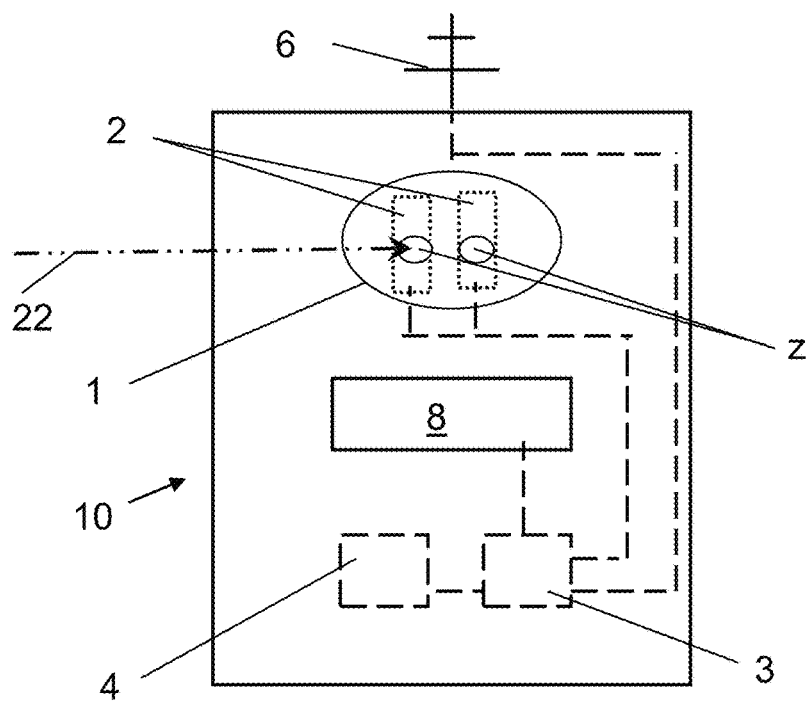
FIG. 1b shows an alternative embodiment of the inventive laser receiver.

According to a preferred embodiment of the invention, the photo sensitive elements 2 of the laser light photo sensor 1 of the laser receiver 10 are provided in the form of photodiodes, in particular in the form of avalanche photodiodes or PSD sensors. The zero position indicated by a "c" is in the centre of the linear array of the photo sensitive elements 2. As it is shown in FIG. 1b, it is also possible to arrange two arrays of photosensitive sensors 2 parallel and apart from each other in a predetermined distance, so that they can be used for distance measurement using the time of passing method. A further possibility is to use a plurality of linear arrays of photo sensitive elements arranged on the lateral surface of an cylinder integrated in the laser receiver in way that they are free accessible for the laser beam from all sides, 360° (not shown).

The acceleration sensor 4 in this special embodiment is designed, particularly as a three-axis acceleration sensor, to detect movements or accelerations of the laser receiver 10 in three different spatial directions. This facilitates the determination of the movement direction of the laser receiver 10 with respect to the laser light laser plane 23. As usual the acceleration sensor also operates as a gravity sensor indicating inclination of the laser receiver with respect to a plump-position.

Preferably, the laser receiver 10 is provided with communication means 6, which are preferably designed for remote, i.e. wireless, communication. The communication means 6 can be a communication signal transmitter or a communication signal transceiver dependent on the application requirements. The communication means 6 is connected to the circuitry, so that the derived information about movement of the laser receiver, movement of the laser receiver with respect to the laser light plane 23, or of an on-grade of the laser receiver 10 with the laser beam 22 can be transmitted to further units like the laser emitter emitting the detected laser beam 22 and or an external data analyzing unit, or a control unit, like a joystick unit or the like used by an operating person in order to control, i.e. the laser emitter or a construction machine.

In case, the communication means 6 is a transceiver, the circuitry 3 of the laser receiver 10 is preferably configured to process incoming information. The incoming information can be received from external units, like data analyzing units, control units or from the laser emitter 20 and the circuitry 3 might than, i.e. indicate those information to a user 5 by means of the output means or correlate the information with the information generated by the laser receiver it self and indicate the result of this correlation on the output means or transmit them via the communication means.

Figure 2:
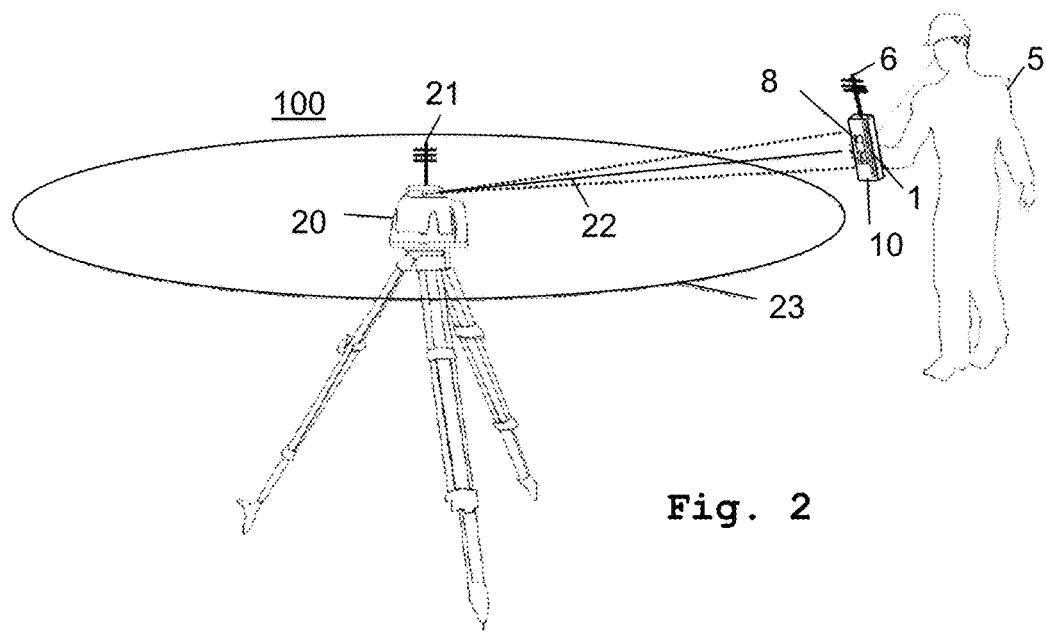
FIG. 2 shows an embodiment of the inventive laser system comprising a rotating construction laser and an inventive laser receiver.

FIG. 2 shows an embodiment of the inventive laser system 100 comprising a laser receiver 10 according to the invention and in this example a rotating construction laser 20 designed to provide a laser light plane 23 upon rotating the emitted laser beam 22, one exemplary embodiment of the laser receiver 10 is described above related to FIG. 1. The laser receiver 10 illustrated here in FIG. 2 is a small hand-held version of the laser receiver 10 according to the invention.

Using the information of the acceleration sensor 4 of the laser receiver 10 a user, i.e. a construction worker 5, needs to sweep the inventive laser receiver 10 only once through the laser light plane 23 generated by the rotating laser beam 22 in order to derive the moving direction of the laser receiver 10 with respect to the laser beam 22. Hence the sweep speed used for moving the laser receiver 10 through the laser plane 23 can be increased. Thus, the invention enables to locate the laser beam 22 and the laser light plane 23, respectively more efficiently. The same would be applicable, if the laser beam would be emitted by a line laser in form of a fan like laser beam (not shown).

Figure 3:
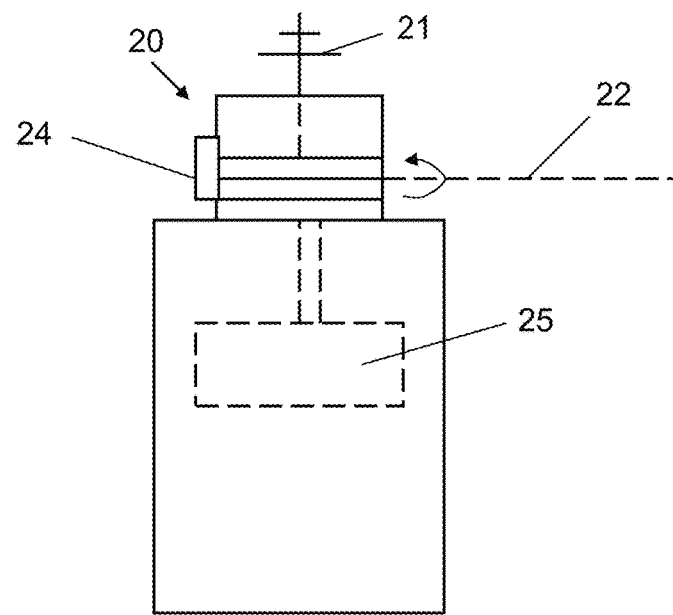
FIG. 3 shows a rotating construction laser of an inventive laser system with related components.

In the shown embodiment of the inventive laser system 100, laser emitter 20 and laser receiver 10 are provided with communication means 6, 21 designed for, particularly remote, i.e. wireless, communication. The laser receiver 10 comprises at least a communication signal transmitter and the laser 20 comprises at least a communication signal receiver, so that the laser receiver 10 can transmit information to the laser emitter 20. The laser emitter 20 in form of a rotating construction laser further comprises a control unit 25 (see FIG. 3) connected to the communication signal receiver in order to process the incoming communication signal. The control unit 25 is further provided with an adjustment unit 24 for adjusting at least one of a rotating head speed and/or movement direction of the head of the reference laser beam 22, a tilt of the reference light plane generated by the transmitted laser beam 22, elevation of the reference light plane 23 generated by the transmitted laser beam 22, the focus of the emitted laser beam 22 and the light intensity of this laser beam 22. The control unit 25 is connected to the communication means 21 of the laser 20, allowing for correlation of the adjustment with communicated signals from the laser light photo sensor 1 and the acceleration sensor 4 of the laser receiver, particularly correlation with movements of the laser receiver 10 and directions of movement of the laser receiver 10. Thus, rotating construction laser 20 can, i.e. accelerate the head speed of the rotating laser beam 22 in order to allow an even faster location of the laser beam 22, as rotating faster means that the construction worker 5 can sweep the laser receiver 10 faster and can repeat sweeping with a higher rate.

The communication means of both the laser emitter 20 and the laser receiver 10 can also be provided in form of communication signal transceivers dependent on the intended application. First and foremost the communication means 6, 21 serve for communication between the laser 20 and the laser receiver 10. However, external data analyzing units or control units etcetera might also communicate with the laser receiver 10 or the laser emitter 20.

Advantageously the control unit 25 of the laser 20 can be provided with search functionality in order to relocate the laser receiver 10 if the optical contact between the laser 20 and the laser receiver 10 is lost. This is most advantageous if, the communication means 21, 6 of the laser emitter 20 and the laser receiver 10 are communication signal transceivers.

Figure 4:
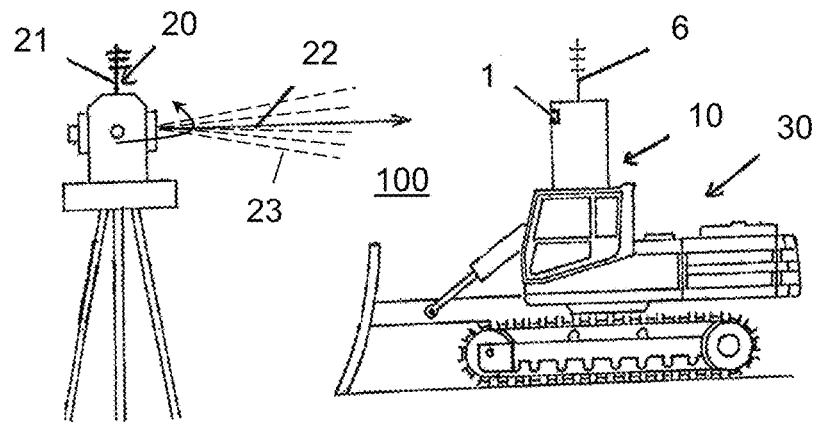
FIG. 4 illustrates an application of the inventive laser system for guiding a construction machine.

FIG. 4 illustrates an application of the inventive laser system 100 for guiding a construction machine 30. A laser receiver 10 as shown and described above is attached to and movable with the construction machine 30. The laser receiver 10 may be mounted on top of the construction machine 30 as shown, or any other region of the construction machine 30, so that the laser light photo sensor 1 of the laser receiver 10 is optically accessible for the reference laser beam 22. In the shown example laser emitter 20 is a line laser 20' emitting a vertical expanded laser beam 22' generating a vertical laser light plane 23' with an expanding angle α. Laser emitter 20 and laser receiver 10 are both provided with communication signal transceivers 6, 21, so that they can transmit and receive information to and from each other.

For the illustrated embodiment of the inventive laser system 100, the laser receiver 10 is an integral part of a guiding system for the construction machine 30, which may, particularly, be operated unattended or under remote control. If the laser receiver 10, provided according to the invention with an acceleration sensor 4, has lost optical contact with the laser beam 22', an operation mode of the laser 20' may (automatically) be switched to a search mode and start a search for the laser receiver 10 and the construction machine 30. In order to relocate the laser receiver 10 and the construction machine 30, the search mode may include an increased rotation speed of the emitted reference laser beam 22' of the rotating construction laser and/or upward or downward changes of the elevation of the laser light plane 23' generated by the rotating laser beam 22' or amendments in orientation, in particular tilt of the generated laser plane 23', based on information from the acceleration sensor 4 of the laser receiver 10 about the direction of movement of the laser receiver 10 with respect to the laser light plane 23' immediately before the optical contact was getting lost.

As shown above, an adjustment/localization of the laser plane in response to a movement of the laser receiver 10 with respect to the laser plane 23 can be automated by using the inventive laser system 100, requiring at most one person 5 at the site of the laser emitter 20 or the laser receiver 10. If the laser receiver 10 is moved in an unattended manner, e. g. mounted on a construction machine 30 with unattended operation, even no operating person may be required.

In cases where the position of the lost laser receiver 10/construction machine 30, is not known at all, the angular extent of laser light plane 23' may be restricted, in particular by beam masking. Thereby, the laser receiver 10/construction machine 30 can be relocated in an iterative process and time for relocation of the laser receiver 10/construction machine 30 can be shortened.

In an alternative embodiment the circuitry 3 of the laser receiver 10 and/or the control unit 25 of the laser emitter 20, 20' are designed to determine the 3-dimensional position of the laser receiver 10 in relation to the laser emitter 20, 20' based on the output signals of the laser light photo sensor 1 and the acceleration sensor 4 provided when illuminated by the laser beam 22, 22' of the laser emitter 20, 20' providing at least two laser light planes having different inclination angles and/or a different offset. The advantage of this embodiment is that the last position of the laser receiver will be known in case the contact to the laser emitter gets lost, so that beam masking or pendulum movement of the laser beam in a restricted angle range are not necessary.

Figure 5:
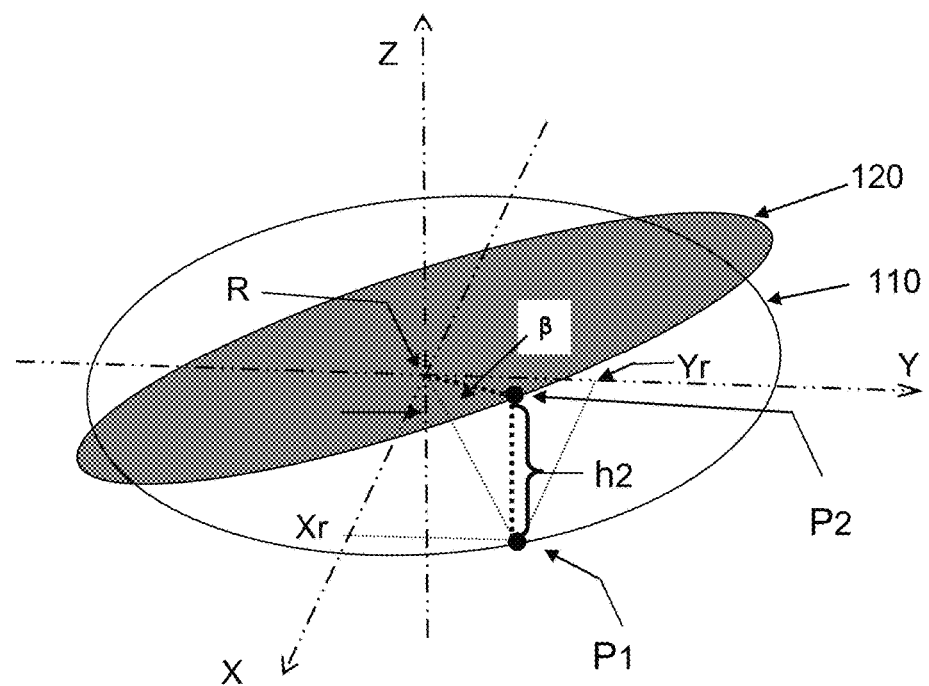
FIG. 5 illustrates how the 3-dimensional position of the laser receiver can be determined in relation to the laser emitter based on the output signals of the laser light photo sensor and the acceleration sensor.

In FIGS. 5, 6a, 6b, 7a and 7b it is shown how the 3-dimensional position of the laser receiver 10 with respect to the laser emitter orientation can be determined based on the output signals of the laser light photo sensor 1 and the acceleration sensor 4 without requiring additional components in the laser emitter or laser receiver. The laser exit aperture of the laser emitter is indicated as R, the coordinate system of the laser emitter is given by X-, Y- and Z-direction. A laser plane generated by the laser emitter through its origin R can in general be described by:

$$a \cdot x + b \cdot y + z = 0,$$

wherein the z-coordinate gives the relative height hi measured from the laser exit aperture R of the laser emitter within the emitter based coordinate system. In FIG. 5 a level plane (zero plane, horizontal) 110 generated by a rotating beam of a laser emitter with origin R is shown and an intercept P1 of a laser receiver with the level plane 110. The rotating laser beam irradiates the linear photo sensor of the laser receiver at location P1, having fixed coordinates Xr and Yr in the coordinate system of the laser emitter, e. g. when the laser receiver is fixed on a pole. In order to determine the 3D position (x,y,z) and the accurate azimuth angle in the emitter coordinate system—determined by XR, YR of the receiver—a second laser plane 120 with a known inclination angle is emitted generating an intercept P2 of the photo sensor of the fixed positioned laser receiver with said second laser plane 120 external of the zero position. The distance hi (in FIG. 5: h2) between a first intercept (in FIG. 5: P1) and a second intercept (in FIG. 5: P2) at the photo sensor of the laser receiver is called in general relative height hi. Said relative height hi of the intercept P2 of the known laser plane 120 generated by the rotating laser beam of the laser emitter and the level plane (zero plane) 110 is measured using the photo sensor of the laser receiver. Thus, in case the receiver is centered to the zero plane 110 of the laser emitter—that means the zero position c of the photo sensor is irradiated by the laser beam generating the level plane 110—the 3D position (x,y,z) coordinates of the receiver can be determined according to the following equations when generating two different known laser planes. And by that an accurate azimuth angle of the receiver in the coordinate system of the emitter can be determined.

$$a_1 \cdot x_R + b_1 \cdot y_R + h_1 = 0$$

$$a_2 \cdot x_R + b_2 \cdot y_R + h_2 = 0$$

With: $a_i$, $b_i$ known parameters of the laser plane (derived from the inclination sensors/grade sensors of the laser emitter having an accuracy in the range of arcseconds) and $h_i$ the measured height (z-direction) at the receiver. Solving the equations for coordinate positions $y_r$ and $x_r$ =>

Equation set 1

$$y_R = \frac{a_1 \cdot h_2 - a_2 \cdot h_1}{a_2 \cdot b_1 - a_1 \cdot b_2}$$

$$x_R = \frac{b_2 \cdot h_1 - b_1 \cdot h_2}{a_2 \cdot b_1 - a_1 \cdot b_2}$$

coordinate positions when zero position of receiver is in the level plane

Singularity for this equation exists, e.g.: zero plane: a1=0 and b1=0: $a_2 \cdot b_1 - a_1 \cdot b_2 = 0$ or $a_2 \cdot b_1 = a_1 \cdot b_2$.

For this equation set to be valid, the laser receiver has to be stable with respect to the level plane 110, e. g. when the receiver is held on-grade to the level plane 110. If the receiver is held on-grade the plane 120 is adjusted by user input or automatically by receiver signal to plane 110 to determine the receiver position.

Dislocating the receiver and repeating the procedure described above generates 3D positions of the receiver in the coordinate system of the laser emitter at two ore more locations. Relative measurements between these locations can be made, for instance for stake out applications.

Several further implementations are possible on the laser emitter side, e. g. a single laser emitter providing alternating planes or an emitter formed as a dual beam rotator with 2 beams angled apart, for instance 180 degrees and spanning a different plane. The laser system can also be provided with a laser emitter formed as a dual wavelength laser and with a laser receiver comprising at least 2 different linear laser light photo sensors each of which is sensitive to one of the wavelength emitted by the laser emitter, so that each linear light photo sensor is able to separate a laser plane of respective wavelength emitted by the laser emitter. Thus, each of said laser planes emitted by the laser emitter and having a particular wavelength is filtered at the receiver side and thus can be identified.

In an alternative embodiment the laser receiver provides two spaced apart optical elements/photo sensors. Using the time of passing method, the distance to the laser emitter can be determined. Knowing the distance to the laser emitter, a single non-level plane through the laser receiver is sufficient to calculate its 3D position.

In case the receiver is not centered to the level plane 110—or with other words the laser beam generating the level plane does not match the zero position of the photo sensor, the laser receiver and the laser emitter are not on-grade—if the receiver is not centered of the laser emitter at the onset of the measurement, the 3D position of the laser receiver 10 can be determined by calculate an additional unknown offset height H0 in order to. The unknown offset height H0 (distance between the zero position c of the receiver and the level plane of the laser emitter) can be determined by generating a third laser plane. Even if the third laser plane is considerably above or below the level plane, so that the optical sensor 1 of the receiver 10 detecting the third laser plane does not propagate through the level plane 110, the height offset H0 of the zero position c of the receiver to the level plane of the laser emitter can be determined moving the receiver as long as it catches the laser beam of the third plane, determining its intercept with the third plane and than using the following set of 3 equations:

$a_1 \cdot x_R + b_1 \cdot y_R + (h_1 + H_0) = 0$ $a_2 \cdot x_R + b_2 \cdot y_R + (h_2 + H_0) = 0$ $a_3 \cdot x_R + b_3 \cdot y_R + (h_3 + H_0) = 0$ Thus, when the zero position c of the receiver 10 is not in the level plane 110 the coordinate positions $y_r$ and $x_r$ are=>

Equation set 2

$$y_R = \frac{a_1 \cdot (H_0 + h_2) - a_2 \cdot (H_0 + h_1)}{a_2 \cdot b_1 - a_1 \cdot b_2}$$

$$x_R = \frac{b_2 \cdot (H_0 + h_1) - b_1 \cdot (H_0 + h_2)}{(a_2 \cdot b_1 - a_1 \cdot b_2)}$$

$$H_0 = \frac{h_1 \cdot (b_3 \cdot a_2 - a_3 \cdot b_2) + h_2 \cdot (b_1 \cdot a_3 - a_1 \cdot b_3) + h_3 \cdot (b_2 \cdot a_1 - a_2 \cdot b_1)}{a_3 \cdot (b_2 - b_1) + a_1 \cdot (b_3 - b_2) + a_2 \cdot (b_1 - b_3)}$$

coordinate positions when center of receiver is not on the level plane.

Using this method, the height $H_0$ of the receiver in relation to the leveled laser plane can be determined. Also the 3D position of the receiver in relation to the coordinate system of the laser emitter can be determined.

In case of a singularity of a plane, e. g. where one of the 3 planes is the level plane (a1=0 and b1=0), the height offset $H_0$ can be determined directly as long as the photo sensor of the receiver propagates through the leveled plane ($H_0$=-h1). Knowing the offset $H_0$ of the receiver, the remaining two planes are sufficient for determining the receiver position. The number of planes can be reduced by one plane in case the distance between the laser receiver and the laser emitter is known from for instance the time of passing method.

As an additional application, the 3D coordinates of the laser receiver like distance, azimuth angle, inclination angle can be calculated and be shown to the user e. g. on the display of the receiver or the display of an external unit. With known 3D positions of the laser receiver determined by using at least two different laser planes, the distance and orientation of these two positions with respect to each other and with respect to the laser emitter at the origin can be determined. In case the distance between the laser emitter and the laser receiver is known, the number of planes required can be reduced by one.

This method can also be used for slope matching (described e. g. in U.S. Pat. No. 6,314,650 B1). The method can be employed both from unknown start position of the laser receiver as well as from a known start position of the laser receiver. The laser emitter is configured in a way that the generated laser beam or laser plane follows the movement of the laser receiver to lead the laser beam to a new position, where e. g. a new laser plane with according orientation can be generated. Explanations are given with reference to FIGS. 7a, 7b wherein dimension Z is not shown in FIG. 7a in order for facilitating readability.

Equation system 4

$a_1 \cdot x_R + b_1 \cdot y_R + (h_1 + H_{01}) = 0$ $a_2 \cdot (x_R + \Delta x_1) + b_2 \cdot (y_R + \Delta y_1) + (h_2 + H_{02}) = 0$ and $h_1 + H_{01} + \Delta Z_{accelerate} = h_2 + H_{02}$ -continued $$\Delta x_1 = \Delta X_{accelerate} \cdot \sin(\Theta + \varepsilon) + \Delta Y_{accelerate} \cdot \cos(\Theta + \varepsilon)$$

$$\Delta y_1 = \Delta X_{accelerate} \cdot \cos(\Theta + \varepsilon) + \Delta Y_{accelerate} \cdot \sin(\Theta + \varepsilon)$$

$$\tan\Theta = \frac{y_R + \Delta y_1}{x_R + \Delta x_1}$$

The location the laser beam irradiates the photo sensor of the laser receiver in a first location is indicated with $P_0$ having coordinates Xr, Yr and an offset $H_{01}$ in Z-direction of the coordinate system of the laser emitter, which is again indicated by axis X, Y, Z. Location $P_0$ lies in a first plane having an inclination angle $\Theta r$ in relation to the x-axis of the coordinate system of the emitter. R indicates the origin of the laser beam and of the coordinate system of the emitter. $X^0$ac, $Y^0$ac, $Z^0$ac indicate the coordinate system of the laser receiver in the first location $P_0$ defined by a three-axis accelerometer sensor of the receiver. The laser receiver is displaced from first location $P_0$ to a second location $P_1$ having coordinates $X_2$, $Y_2$, and an offset $H_{02}$ in Z-direction in the emitter coordinate system. The displacement occurs along a displacement vector indicated by an arrow. The displacement results in a difference $\Delta H$ to offset $H_{01}$ and differences $\Delta X_1$, $\Delta Y_1$ in the X- and Y-axis of the coordinate system of the emitter. During such a displacement the receiver is often rotated willingly or occasionally, so that at the second location $P_1$ a coordinate system $X^1$ac, $Y^1$ac, $Z^1$ac of the laser receiver results showing a displacement angle $\epsilon$ and differences $\Delta X_{ac}$, $\Delta Y_{ac}$, $\Delta Z_{ac}$ (not explicitly shown) in relation to the coordinate system $X^0$ac, $Y^0$ac $Z^0$ac of the laser receiver in the first location $P_0$. At the photo sensor of the laser receiver the irradiation position, where the laser beam hits the sensor, my also moved from a position having an offset $h_1$ in relation to the zero position c to a position having an offset $h_2$.

When the first position P' ($X_R$, $Y_R$ and $H_{01}$) is known, the unknowns in this equation system are: $\Delta X_1$, $\Delta Y_1$, $H_{02}$ and $\xi$. Assuming $\epsilon$ is the rotation of the receiver around the Zac-axis, and assuming that the Zac-axis of the receiver coordinate system and the Z-axis of the emitter coordinate system co-inside (FIG. 7b), the equation system can be solved, requiring only 2 planes. With more degrees of freedom like the inclination of the vertical (Z-Axis) of the receiver additional planes are required.

In case the distance $d_1$ at the first location $P_0$ and distance $d_2$ at the second location $P_1$ between the laser emitter and the laser receiver is measured or known (for instance by using the time of passing method), two more equations are available:

$$x_R^2 + y_R^2 + (h_1 + H_{01})^2 = d_1^2$$

$$(x_R + \Delta x_1)^2 + (y_R + \Delta y_1)^2 + (h_2 + H_{02})^2 = d_2^2$$

With unknown start position $P_0$ ($X_R$, $Y_R$ and $H_{01}$ are unknown), the unknowns in the equation system are: $X_R$, $Y_R$, $H_{01}$, $\Delta X_1$, $\Delta Y_1$, $H_{02}$ and $\epsilon$. With the additional equations for the distance, a solution to equation system 4 can be found (using just 2 planes, with unknown start position of the receiver).

Figure 6A:
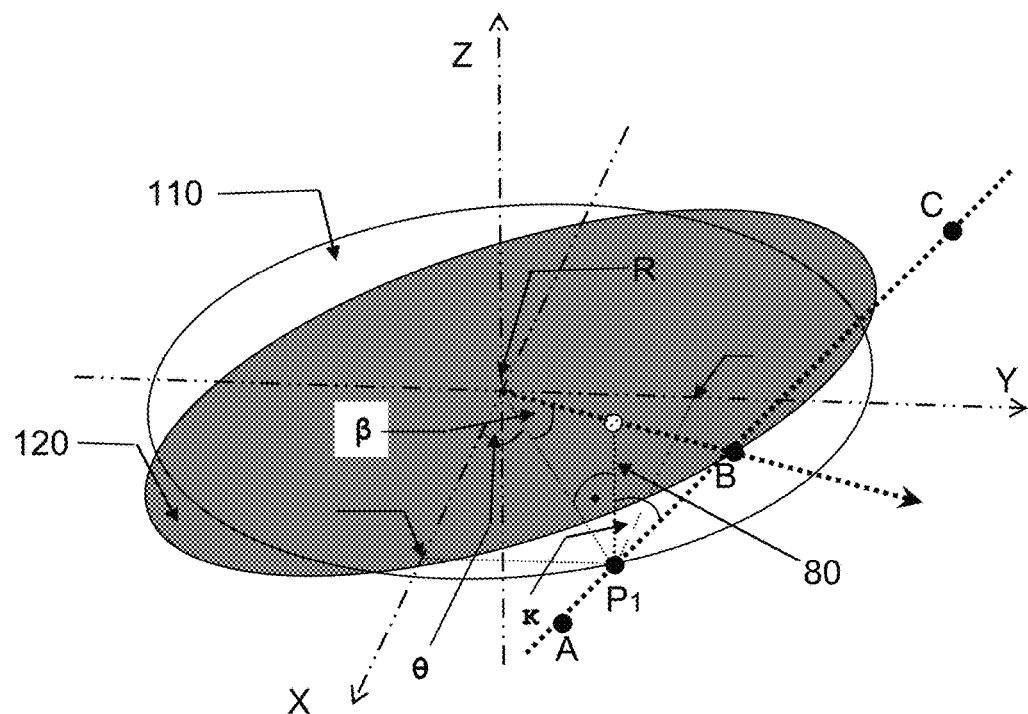
FIGS. 6a-b illustrate the situation with an inclined laser receiver.
Figure 6B:
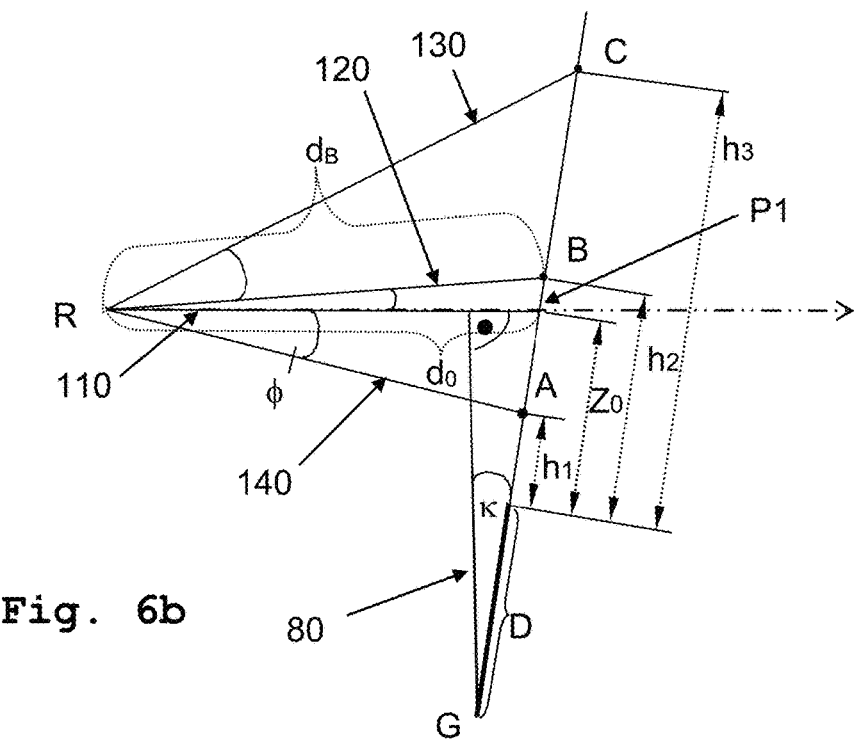
Figure 7A:
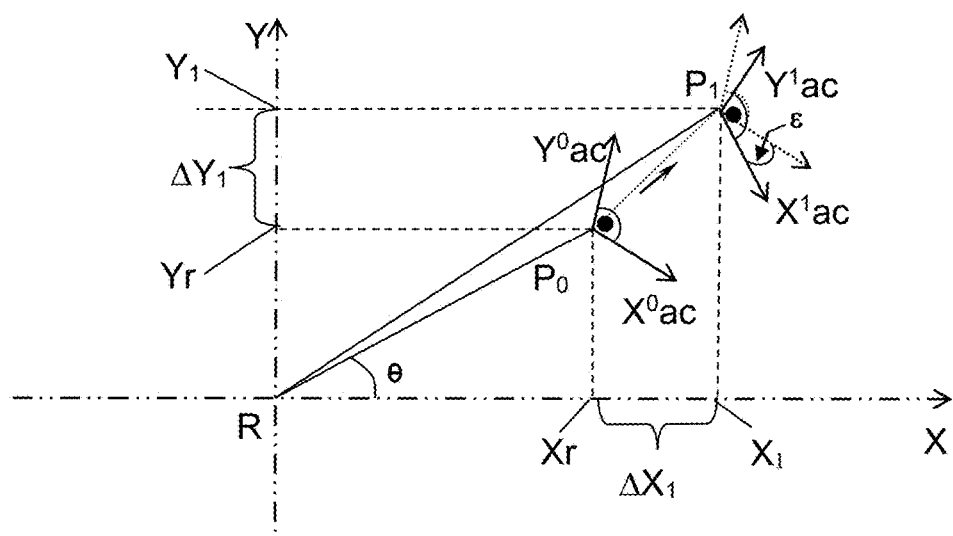
FIGS. 7a-b illustrate the situation when the laser receiver is displaced.
Figure 7B:
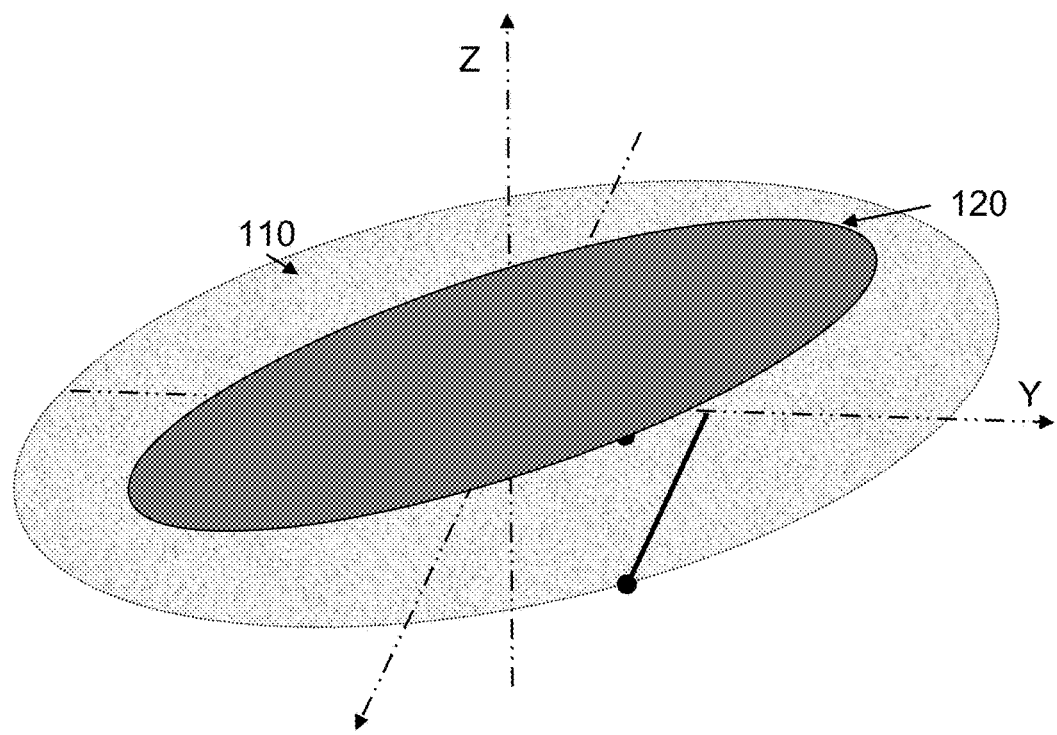

In FIG. 6a, 6b In case the laser receiver is fix located but inclined with an unknown space angle κ in relation to the ideal position perpendicular to the level plane 110 of the laser emitter or with other words inclined by space angle κ in relation to a virtual line 80 orthogonal to the laser beam generating level plane 110. The space angle has a first component $\kappa_1$ and a second component $\kappa_2$ in X- and Y-direction, respectively of the coordinate system of the laser emitter. The photo sensor of the laser receiver intercept level plane at $P_1$ and an inclined second laser plane 120 (inclined by angle β) at point B having an intercept height h2, a third and fourth inclined plane 130, 140 at points C and A having intercept heights h3 and h4, respectively. The laser receiver may further have a marking and may be established with this marking having an offset D in relation to its pivoting point G (e. g. when mounted on a pole and the pole is fixed at the ground in point G), whereby $Z_0$ is the distance between the marking and intercept of the level plane 110 and the photo sensor of the receiver and d0 is the distance between emitter and receiver in the level plane 110. In such a case the 3D position of the laser receiver can be calculated by solving the following equation set 3.

$$a_1 \cdot x_R + b_1 \cdot y_R + (h_1 + Z_0) \cdot \cos \kappa = 0$$

$$a_2 \cdot x_R + b_2 \cdot y_R + (h_3 + Z_0) \cdot \cos \kappa = 0$$

$$a_3 \cdot x_R + b_3 \cdot y_R + (h_3 + Z_0) \cdot \cos \kappa = 0$$

$$a_4 \cdot x_R + b_4 \cdot y_R + (h_4 + Z_0) \cdot \cos \kappa = 0$$

Equation set 3: coordinate positions when zero position of the receiver is not in the level plane and receiver is inclined In case the inclination angles α, φ, γ of the inclined laser planes 120, 130, 140 are known, for instance along one of the coordinate axis of the laser emitter system, and using the sine law, e. g. for inclined plane 120 the distance $d_B$ between emitter origin R and the laser receiver intercept B and the inclination angle κ of the laser receiver with respect to a line orthogonal to the laser beam of the laser emitter can be computed easily. Triangle R, B, C and Triangle R, A, B both share the same side R, B with distance $d_B$. Unknowns are angle κ and distances $d_i$. This method requires only 3 planes, e. g. planes 120, 130, 140 in FIG. 6.

Alternatively the 3D position of the laser receiver can be estimated by using the sine law or through iteration.

$$\frac{h3 - h2}{\sin(\gamma - \alpha)} = \frac{d}{\sin(\pi/2 - \gamma - \kappa)}$$

$$\frac{h2 - h1}{\sin(\alpha + \phi)} = \frac{d}{\sin(\pi/2 - \alpha - \kappa)}$$

The iteration process can be solved through: first assuming that the receiver is upright, knowing that $\cos(\kappa) \approx 1$ for small κ (range up to 10 degrees) and the positional calculation according to equation 2. Each combination of two of the three planes builds a triangle between the two intercept points at the position of the receiver and the location of the laser emitter (Triangle: R, A, B or triangle R, A, C or triangle R, B, C). Having determined a more accurate estimate for the according distance $d_0$ ($d_0$=root of $X_R$ and $Y_R$), by using the sine law, the first estimation of the receiver position ($X_R$ and $Y_R$) can be improved. Using the improved receiver position in combination with the equation set 3, an estimate of the receiver inclination κ can be determined. Using an estimate of the laser receiver inclination κ the distances of the intercept heights from in equation 2 can be adjusted. The iteration continues until the change in $Z_0$ and or inclination angle κ is below a selected percentage (1%). This results in an estimation of the distance $d_0$ between laser emitter and receiver and the inclination □ of the laser receiver in direction of the laser propagation at the position of the receiver in the laser plane 110 (in direction of the angle κ). Alternative iteration methods exist, for instance including an additional loop for the receiver position.

Knowing the position $X_R$ and $Y_R$ of the laser receiver in combination with the estimated inclination angle κ of the laser receiver in the direction of the laser beam and knowing the inclination of the laser receiver with respect to the gravity field from the acceleration sensor of the laser receiver, the horizontal orientation of the laser receiver with respect to the laser beam and the laser emitter, respectively can be determined (6 degrees of freedom, short: 6 dof). Thereby the gravity referenced inclination of the laser receiver is preferably linked to the housing orientation of the laser receiver.

Another method of deriving a 6 dof solution on a machine is by mounting two receivers on the machine, spaced apart from each other in a fixed distance, a fixed height and a fixed orientation relative to each other. Using the 3D position information of the two receivers and the data characterizing their relative position, the position and orientation of the machine can be determined.

Knowing the position of the receiver Xr, Yr, the alignment angle of the receiver to the orientation of the laser emitter can be calculated (see FIG. 6*b*):

$$\tan\Theta = \frac{Y_R}{X_R} = \frac{a_1 \cdot h_2 - a_2 \cdot h_1}{b_2 \cdot h_1 - b_1 \cdot h_2} \text{ or in general:}$$

$$\frac{a_1 \cdot (h_2 + H_0) - a_2 \cdot (h_1 + H_0)}{b_2 \cdot (h_1 + H_0) - b_1 \cdot (h_2 + H_0)}$$

in case $h_1=0$ and with the receiver centered on the level plane:

$$\tan\Theta = -\frac{a_1}{b_1}$$

During the method described above, the receiver is preferably stationary or slow moving. In case the receiver is moving, the movement of the receiver can be estimated using the acceleration sensor. For small movements, preferably the height and positional increments during measurement of the planes are taken in to account. In case the movement of the laser receiver is too heavy—which particularly can occur when the laser receiver is mounted on a vehicle or machine—the position determination is either abandoned or restarted; wherein a too heavy movement of the laser receiver means e. g. that the acceleration value detected by the acceleration sensor increases over a predetermined threshold.

As it has been shown, using an iteration technique as described above estimates for the receiver position and orientation can be given. Knowing the distance between the laser receiver and the laser emitter, the number of planes required to determine the receiver position can be reduced by 1 (for equation systems 1, 2 and 3). In addition, reducing the number of planes required for determining the position and or orientation of the receiver reduces the motion uncertainty of the moving receiver.

In general, determining 3D position of the laser receiver in the laser system according to the invention allows an even more efficient and precise location of laser line planes of the laser emitter, especially when the more than one laser plane or more than on location of the laser receiver have to be prospected at a construction site or if the optical contact between laser emitter and laser receiver get accidentally lost. Furthermore, knowing the 3D position allows calculating of distance, azimuth angle and so on of the laser receiver, which facilitates additional applications. For instance, the disadvantages caused by defocusing and dimming tendencies shown by laser beams of e. g. conventional rotating construction lasers at further distance to the light source, can be overcome by dynamic focusing of the laser beam knowing the distance of the object, which can be derived by determining the 3D position of a laser receiver at the location of the object in question.

It is clear for a person skilled in the art that instead of using two or more laser planes, respectively, with different inclination angles, two or more laser planes having different offsets with respect to the level plane can be used for determining the 3D position of the laser receiver.

Determination of the 3D position of the laser receiver 10 in the above described way is also advantageously applicable when the laser system 100 is used for machine guiding as illustrated in FIG. 4. In an alternative embodiment, the machine 30 can be equipped with 2 or more laser receivers (not shown). Knowing the 3D position of at least two laser receivers spaced apart with a fixed distance, the position as well as orientation of the machine 30 can be determined (6 degrees of freedom).

Figure 8:
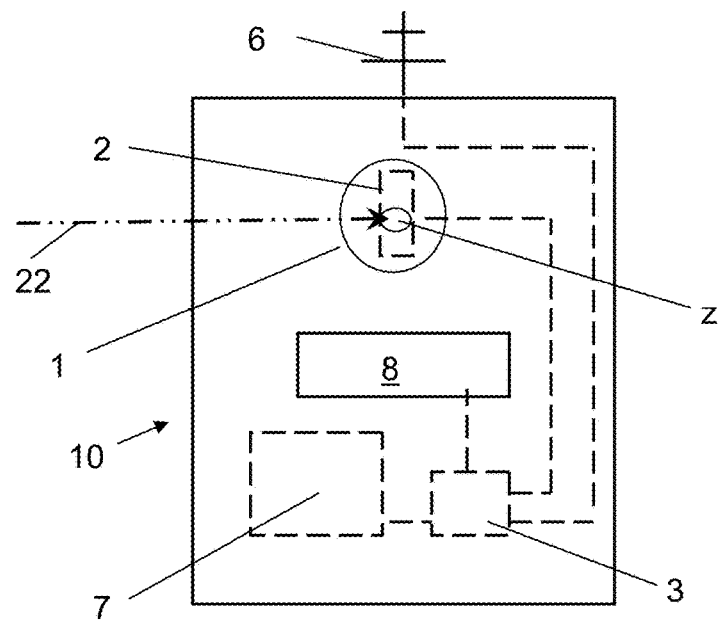
FIG. 8 shows another embodiment of the inventive laser receiver.

FIG. 8 shows an illustration of another embodiment of the laser receiver 10. The laser receiver 10 comprises a laser light photo sensor 1 having a plurality of photo sensitive elements 2 arranged in a linear array, which photo sensitive elements 2 providing an electrical output when illuminated by a reference laser beam 22. The laser light photo sensor and the photo sensitive elements 2, respectively are connected to a circuitry 3. Particularly, the reference laser beam 22 may originate from a rotating construction laser designed to provide a laser light plane upon rotating the emitted laser beam 22 or from a line laser emitting an expanded fan like laser beam (not shown).

The laser receiver 10 comprises a trajectory sensor unit 7 also connected to the circuitry 3. The trajectory sensor unit 7 is designed to is designed to provide an electrical output signal when the laser receiver 10 is moved. The trajectory sensor unit 7 can comprise an inertial measurement unit (IMU), particularly comprising three acceleration sensors, three gyroscopes and optionally three magnetometers. The electrical output signal further indicates a movement and a movement direction of the laser receiver 10.

The circuitry 3 of the laser receiver is configured to compute and correlate the incoming electrical signals from the photo sensor 1 and the trajectory sensor unit 7 to provide a correlation signal indicating the movement of the laser receiver 10 with respect to the laser beam 22. The circuitry 3 is further connected to an output means 8. In this example the output means 8 is a display and, i.e. the moving direction of the laser receiver 10 with respect to the laser beam 22 is indicated to a user 5 (FIG. 9) on the display 8. Further output means in form of a loudspeaker (not shown) may be integrated in the laser receiver as well.

Further the circuitry 3 of the laser receiver is configured to derive movement acceleration and/or movement velocity and/or an estimated end position of the movement of the laser receiver 10 from the electrical output signal of the trajectory sensor unit 7.

Further the trajectory sensor unit 7 continuously provides an electrical output signal indicating a trajectory of the movement of the laser receiver 10, and the circuitry 3 is designed to derive a relative position of the laser receiver 10 from said electrical output signal.

Preferably, the electrical output signal of the trajectory sensor unit 7 indicates a trajectory of a movement of the laser receiver 10 in six degrees-of-freedom, and the circuitry 3 is designed to derive a three-dimensional position of the laser receiver.

According to a preferred embodiment of the invention, the photo sensitive elements 2 of the laser light photo sensor 1 of the laser receiver 10 are provided in the form of photodiodes, in particular in the form of avalanche photodiodes or PSD sensors. The zero position indicated by a "z" is in the centre of the linear array of the photo sensitive elements 2. As it is described further above with respect to FIG. 1b, it is also possible to arrange two arrays of photosensitive sensors 2 parallel and apart from each other in a predetermined distance, so that they can be used for distance measurement using the time of passing method.

The trajectory sensor unit 7 may comprise an inertial measurement unit, e. g. having a three-axis acceleration sensor, to detect movements or accelerations of the laser receiver 10 in three different spatial directions. This facilitates the determination of the movement direction of the laser receiver 10 in order to determine the trajectory. As usual the acceleration sensor also operates as a gravity sensor indicating inclination of the laser receiver with respect to a plumb-position.

The trajectory sensor unit 7 may optionally comprise a pressure sensor for determining changes of the altitude of the laser receiver 10. The trajectory sensor unit 7 may also comprise a visual inertial system that determines a movement of the receiver by visual means. In particular, the visual inertial system is adapted to capture images and to track features in the images during the movement of the laser receiver 10, e. g. for determining eigenposes.

Preferably, the laser receiver 10 is provided with communication means 6, which are preferably designed for remote, i.e. wireless, communication. The communication means 6 can be a communication signal transmitter or a communication signal transceiver dependent on the application requirements. The communication means 6 is connected to the circuitry, so that the derived information about movement of the laser receiver, movement of the laser receiver with respect to the laser light plane 23, of an on-grade of the laser receiver 10 with the laser beam 22 or of a relative position of the laser receiver can be transmitted to further units like the laser emitter emitting the detected laser beam 22 and or an external data analyzing unit, or a control unit, like a joystick unit or the like used by an operating person in order to control, i.e. the laser emitter or a construction machine.

Figure 9:
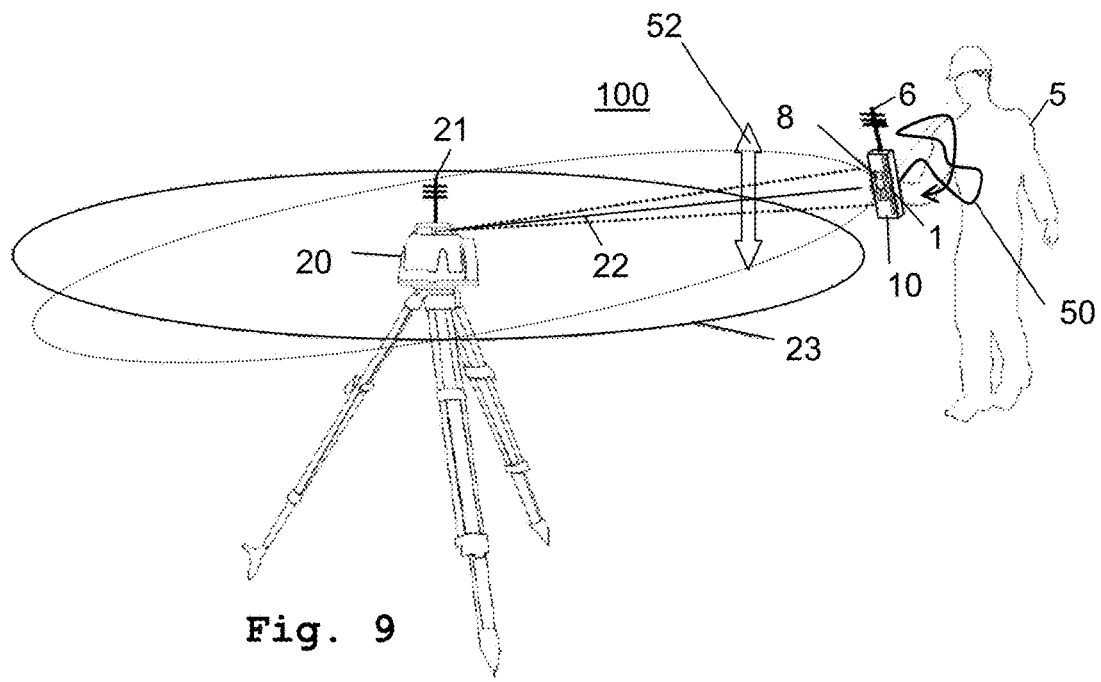
FIG. 9 shows another embodiment of the laser system comprising a rotating construction laser and the laser receiver of FIG. 8, wherein a trajectory of the laser receiver is determinable to derive a position of the laser receiver relative to the construction laser.

FIG. 9 shows another embodiment of the laser system 100 comprising a construction laser 20 and the laser receiver 10 of FIG. 8, wherein a trajectory 50 of the receiver 10 is determinable to derive a position of the receiver 10 relative to the construction laser 20.

The rotating construction laser 20 is designed to provide a laser light plane 23 upon rotating the emitted laser beam 22.

The laser receiver 10 illustrated here is a small hand-held device. It comprises a trajectory sensor unit designed to continuously provide an electrical output signal indicating a trajectory 50 of a movement of the laser receiver 10. The laser receiver 10 also comprises a circuitry that is designed to derive a position of the laser receiver 10 relative to the laser emitter 20 from computing and correlating the output signal of the trajectory sensor unit and the output signal of said laser light photo sensor.

Using the information of the trajectory sensor unit 7 of the laser receiver 10, a user, i.e. a construction worker 5, needs to sweep the laser receiver 10 only once through the laser light plane 23 generated by the rotating laser beam 22 in order to derive consequently a position of the laser receiver 10 with respect to the laser beam 22. From the point of time when the laser light plane 23 is crossed so that the laser beam 22 is received on a photosensitive sensor of the laser receiver 10, the movements of the laser receiver are determined continuously, so that a movement path can be tracked and a trajectory 50 of the receiver 10 can be calculated.

In the shown embodiment of the laser system 100, laser emitter 20 and laser receiver 10 are provided with communication means 6, 21 designed for, particularly remote, i.e. wireless, communication. The laser receiver 10 comprises at least a communication signal transmitter and the laser 20 comprises at least a communication signal receiver, so that the laser receiver 10 can transmit information to the laser emitter 20.

The laser emitter 20 in form of a rotating construction laser further comprises a control unit 25 (see FIG. 3) connected to the communication signal receiver in order to process the incoming communication signal. The control unit 25 is further provided with an adjustment unit 24 for adjusting at least one of a rotating head speed and/or movement direction of the head of the reference laser beam 22, a tilt of the reference light plane generated by the transmitted laser beam 22, elevation of the reference light plane 23 generated by the transmitted laser beam 22, the focus of the emitted laser beam 22 and the light intensity of this laser beam 22. The control unit 25 is connected to the communication means 21 of the laser 20, allowing for correlation of the adjustment with communicated signals from the laser light photo sensor 1 and the acceleration sensor 4 of the laser receiver, particularly correlation with movements of the laser receiver 10 and directions of movement of the laser receiver 10. Thus, rotating construction laser 20 can, i.e. accelerate the head speed of the rotating laser beam 22 in order to allow an even faster location of the laser beam 22, as rotating faster means that the construction worker 5 can sweep the laser receiver 10 faster and can repeat sweeping with a higher rate.

The communication means of both the laser emitter 20 and the laser receiver 10 can also be provided in form of communication signal transceivers dependent on the intended application. First and foremost the communication means 6, 21 serve for communication between the laser 20 and the laser receiver 10. However, external data analyzing units or control units etcetera might also communicate with the laser receiver 10 or the laser emitter 20.

In the depicted embodiment, during the movement of the receiver 10, the laser emitter 20 continuously adjusts the orientation of the laser light plane 23 to keep the laser beam 22 receivable by the photosensitive sensor of the laser receiver 10. The resulting up-and-down movements of the laser light plane 23 at the receiver position are indicated by arrow 52. The trajectory 50 of the laser receiver 10 is three-dimensional, wherefore a distance between receiver 10 and emitter 20 varies during the movement of the receiver 10. Therefore, same tilt amendments of the laser emitter 20 do not result in same movements 52 of the laser light plane 23 at the receiver 10. Instead, the laser beam 22 is received at different sections of the photosensitive sensor of the laser receiver 10, depending on the present between receiver 10 and emitter 20. Using the knowledge of a plurality of such deviations together with the calculated trajectory 50, the exact distance and thus a relative position of the receiver 10 with respect to the emitter 20 is determinable.

The depicted laser emitter 20 then can be adjusted in dependence of processed and computed communication signals from the receiver 10. Said adjustment comprises adjusting a tilt and/or an elevation of the light plane 23 generated by the emitted laser beam 22. Furthermore, the adjustment may optionally comprise focusing and defocusing of the laser beam 22, adjusting the intensity of the laser light of the emitted laser beam, or adjusting a speed of the rotating head.

In one embodiment, the adjustment can be carried out also in dependence of a present tilt of the reference light plane, and/or in dependence of a trajectory of the emitted laser beam.

What is claimed is:

1. A laser system comprising a laser receiver collaborating with a laser emitter, wherein
    the laser receiver is designed to detect the laser light beam of a laser emitter with laser light photo sensor providing an electrical output signal when illuminated by a laser beam;
    the laser receiver further comprises a circuitry designed to receive and to compute the electrical output signal of said laser light photo sensor and a communication signal transmitter for communicating with the laser emitter using communication signals;
    the laser emitter is designed to provide a laser light plane and comprises a control unit connected to a communication signal receiver in order to process and compute the incoming communication signals from the laser receiver;
    the laser receiver has an acceleration sensor designed to provide an electrical output signal indicating a movement of the laser receiver;
    said circuitry is designed to derive the moving direction of the laser receiver with respect to said laser beam from computing and correlating the output signal of the acceleration sensor and the output signal of said laser light photo sensor;
    the laser receiver is designed to communicate the output signals and/or the derived result of the computing and correlation process to the laser emitter which is then processed and computed by the control unit of the laser emitter as incoming communication signals; and
    the control unit of the laser emitter is provided with an adjustment unit and adjustment is carried out by the adjustment unit in dependence of the processed and computed incoming communication signals wherein adjustment comprises adjusting at least one of:
        a tilt of the reference light plane generated by the emitted laser beam;
        an elevation of the reference light plane generated by the emitted laser beam;
        focusing and defocusing of the laser beam;
        adjusting the intensity of the laser light of the emitted laser beam;
        adjusting a rotating head speed of a rotating laser beam; and
        emitting a warning signal,
    wherein the laser system is provided with a laser emitter formed as a dual wavelength laser and provided with a laser receiver comprising at least 20 different linear laser light photo sensors each of which being sensitive to one of the wavelength emitted by the laser emitter, so that each linear light photo sensor is able to separate a laser plane of respective wavelength emitted by the laser emitter.

2. The laser system according to claim 1, wherein the laser receiver and the laser emitter are each provided with communication transceivers in order to send and receive communication signals.

3. The laser system according to claim 1, wherein the laser light photo sensor comprises a plurality of photo sensitive elements arranged in a linear array.

4. The laser system according to claim 1, wherein the circuitry of the laser receiver is further designed to derive the movement acceleration and/or the movement velocity and/or to estimate the movement end position of the laser receiver with respect to said laser beam from computing and correlating the output signal of the acceleration sensor and the output signal of said laser light photo sensor.

5. The laser system according to claim 4, wherein the control unit of the laser emitter is designed to correlate the adjustment with movements of the laser receiver and/or with directions of movement of the laser receiver and/or with an estimated relative end position of the movement of the laser receiver.

6. The laser system according to claim 4, wherein the control unit of the laser emitter is designed to correlate the adjustment with acceleration of the movement of the laser receiver and/or with a velocity of the movement of the laser receiver.

7. The laser system according to claim 4, wherein the control unit of the laser emitter is designed to correlate the adjustment.

8. The laser system according to claim 1, wherein the acceleration sensor of the laser receiver is designed as a three-axis acceleration sensor.

9. The laser system according to claim 1, wherein the laser emitter is
    a rotating construction laser designed to provide a laser light plane upon rotating the emitted laser beam; or
    a line laser designed to emit a laser beam in form of an expanded fan like laser light plane.

10. The laser system according to claim 1, wherein the laser emitter is a rotating construction laser and the adjustment unit is provided for adjusting the rotation speed of the rotating laser beam.

11. The laser system according to claim 10, wherein the circuitry of the laser receiver and/or the control unit of the laser emitter are designed to determine an inclination angle (K) of the laser receiver with respect to a line orthogonal to the laser beam of the laser emitter emitting a level plane, which inclination angle (K) comprising a first component (K1) and a second component (K2).

12. The laser system according to claim 10, wherein the laser system is provided with electronic means for determining the distance between the laser receiver and the laser emitter, wherein the electronic means are at least one out of the group comprising at least: GPS, laser ranger, wireless communication means like ZigBee or LPR systems (laser positioning radar systems), so that the number of planes required for determining the 3-dimensional position of the laser receiver is reduced by one.

13. The laser system according to claim 10, wherein the laser system is provided with electronic means for determining the distance between the laser receiver and the laser emitter by using the time of passing method, so that the number of planes required for determining the 3-dimensional position of the laser receiver is reduced by one.

14. The laser system according to claim 13, wherein the laser system is configured to guide and control a construction machine on a construction site.

15. The laser system according to claim 10, wherein the control unit of the laser emitter is provided with a search functionality in order to re-orientate the laser beam if an optical contact with the laser receiver has been lost.

16. The laser system according to claim 10, wherein the laser receiver is attached to and movable with a construction machine, and the system is designed for control of said construction machine.

17. The laser system according to claim 1, wherein the laser emitter is provided with means for restricting the extent of the laser plane by beam masking or by limiting a pendulum motion of the laser beam between pre-defined end points.

18. The laser system according to claim 17, wherein the circuitry of the laser receiver and/or the control unit of the laser emitter are designed to determine the horizontal orientation of the laser receiver with respect to the laser emitter using the determined inclination angle (K) having a first component (K1) and a second component (K2), whereby said inclination angle (K) is combined with the gravity referenced inclination detected by the acceleration sensor of the laser receiver.

19. The laser system according to claim 1, wherein the circuitry of the laser receiver and/or the control unit of the laser emitter are designed to determine the 3-dimensional position of the laser receiver in relation to the laser emitter based on the output signals of the laser light photo sensor and the acceleration sensor provided when illuminated by the laser beam of the laser emitter providing at least two laser light planes having different inclination angles and/or a different offset.

20. A laser system comprising a laser receiver collaborating with a laser emitter, wherein
the laser receiver is designed to detect the laser light beam of a laser emitter with a laser light photo sensor providing an electrical output signal when illuminated by a laser beam;
the laser receiver further comprises a circuitry designed to receive and to compute the electrical output signal of said laser light photo sensor and a communication signal transmitter for communicating with the laser emitter using communication signals;
the laser emitter is designed to provide a laser light plane and comprises a control unit connected to a communication signal receiver in order to process and compute the incoming communication signals from the laser receiver;
the laser receiver has a trajectory sensor unit designed to continuously provide an electrical output signal indicating a trajectory of a movement of the laser receiver; and
said circuitry is designed to derive a position of the laser receiver relative to the laser emitter from computing and correlating the output signal of the trajectory sensor unit and the output signal of said laser light photo sensor,
wherein the laser emitter is:
a rotating construction laser designed to provide a laser light plane upon rotating the emitted laser beam; or
a line laser designed to emit a laser beam in form of an expanded fan like laser light plane.

21. The laser system according to claim 20, wherein
the laser receiver is designed to communicate the derived position, the output signals and/or the derived result of the computing and correlation process to the laser emitter which is then processed and computed by the control unit of the laser emitter as incoming communication signals; and
the control unit of the laser emitter is provided with an adjustment unit and adjustment is carried out by the adjustment unit in dependence of the processed and computed incoming communication signals wherein adjustment comprises adjusting at least one of
a tilt of the reference light plane generated by the emitted laser beam;
an elevation of the reference light plane generated by the emitted laser beam;
focusing and defocusing of the laser beam;
adjusting the intensity of the laser light of the emitted laser beam; and
adjusting a rotating head speed of a rotating laser beam.

22. The laser system according to claim 21, wherein the adjustment is carried out by the adjustment unit also in dependence of a present tilt of the reference light plane.

23. The laser system according to claim 21, wherein
the laser emitter is adapted to determine a trajectory of the emitted laser beam; and
the adjustment is carried out by the adjustment unit also in dependence of the trajectory of the emitted laser beam.

24. The laser system according to claim 20, wherein the trajectory sensor unit is designed to continuously provide an electrical output signal indicating a trajectory of a movement of the laser receiver in six degrees-of-freedom, and the circuitry is designed to derive a three-dimensional position of the laser receiver.

25. The laser system according to claim 20, wherein the trajectory sensor comprises a three-axis acceleration sensor.

26. The laser system according to claim 20, wherein the trajectory sensor unit comprises an inertial measurement unit.

27. The laser system according to claim 20, wherein the trajectory sensor unit comprises a pressure sensor.

28. The laser system according to claim 27, wherein the trajectory sensor unit comprises a three-axis acceleration sensor or an inertial measurement unit.

29. The laser system according to claim 20, wherein the trajectory sensor unit comprises a visual inertial system having at least one camera.

30. A laser system comprising a laser receiver collaborating with a laser emitter, wherein
the laser receiver is designed to detect the laser light beam of a laser emitter with a laser light photo sensor providing an electrical output signal when illuminated by a laser beam;
the laser receiver further comprises a circuitry designed to receive and to compute the electrical output signal of said laser light photo sensor and a communication signal transmitter for communicating with the laser emitter using communication signals;
the laser emitter is designed to provide a laser light plane and comprises a control unit connected to a communication signal receiver in order to process and compute the incoming communication signals from the laser receiver;
the laser receiver has a movement sensor unit designed to provide an electrical output signal indicating a movement of the laser receiver, the movement sensor unit comprising a pressure sensor;
said circuitry is designed to derive the moving direction of the laser receiver with respect to said laser beam from computing and correlating the output signal of the movement sensor unit and the output signal of said laser light photo sensor;

the laser receiver is designed to communicate the output signals and/or the derived result of the computing and correlation process to the laser emitter which is then processed and computed by the control unit of the laser emitter as incoming communication signals; and the control unit of the laser emitter is provided with an adjustment unit and adjustment is carried out by the adjustment unit in dependence of the processed and computed incoming communication signals wherein adjustment comprises adjusting at least one of a tilt of the reference light plane generated by the emitted laser beam;

an elevation of the reference light plane generated by the emitted laser beam;

focusing and defocusing of the laser beam;

adjusting the intensity of the laser light of the emitted laser beam;

adjusting a rotating head speed of a rotating laser beam; and emitting a warning signal.

31. A laser system comprising a laser receiver collaborating with a laser emitter, wherein the laser receiver is designed to detect the laser light beam of a laser emitter with a laser light photo sensor providing an electrical output signal when illuminated by a laser beam;

the laser receiver further comprises a circuitry designed to receive and to compute the electrical output signal of said laser light photo sensor and a communication signal transmitter for communicating with the laser emitter using communication signals;

the laser emitter is designed to provide a laser light plane and comprises a control unit connected to a communication signal receiver in order to process and compute the incoming communication signals from the laser receiver;

the laser receiver has a movement sensor unit designed to provide an electrical output signal indicating a movement of the laser receiver, the movement sensor unit comprising a visual inertial system;

said circuitry is designed to derive the moving direction of the laser receiver with respect to said laser beam from computing and correlating the output signal of the acceleration sensor and the output signal of said laser light photo sensor;

the laser receiver is designed to communicate the output signals and/or the derived result of the computing and correlation process to the laser emitter which is then processed and computed by the control unit of the laser emitter as incoming communication signals; and the control unit of the laser emitter is provided with an adjustment unit and adjustment is carried out by the adjustment unit in dependence of the processed and computed incoming communication signals wherein adjustment comprises adjusting at least one of a tilt of the reference light plane generated by the emitted laser beam;

an elevation of the reference light plane generated by the emitted laser beam;

focusing and defocusing of the laser beam;

adjusting the intensity of the laser light of the emitted laser beam;

adjusting a rotating head speed of a rotating laser beam; and emitting a warning signal.

* * * * *